United States Patent
Murakami et al.

(10) Patent No.: US 9,921,093 B2
(45) Date of Patent: Mar. 20, 2018

(54) CORIOLIS MASS FLOW METER

(71) Applicant: ATSUDEN CO., LTD., Tokyo (JP)

(72) Inventors: Eiichi Murakami, Tokyo (JP); Yoshiaki Suzuki, Tokyo (JP)

(73) Assignee: ATSUDEN CO., LTD., Tokyo (JP)

( * ) Notice: Subject to any disclaimer, the term of this patent is extended or adjusted under 35 U.S.C. 154(b) by 2 days.

(21) Appl. No.: 15/285,556

(22) Filed: Oct. 5, 2016

(65) Prior Publication Data
US 2017/0102257 A1   Apr. 13, 2017

(30) Foreign Application Priority Data

Oct. 8, 2015 (JP) ................... 2015-200426
Feb. 15, 2016 (JP) ................... 2016-026234
May 16, 2016 (JP) ................... 2016-097983

(51) Int. Cl.
*G01F 1/84* (2006.01)

(52) U.S. Cl.
CPC .......... *G01F 1/8413* (2013.01); *G01F 1/8422* (2013.01); *G01F 1/8472* (2013.01)

(58) Field of Classification Search
CPC ....................................................... G01F 1/84
See application file for complete search history.

(56) References Cited

U.S. PATENT DOCUMENTS

| | | | | |
|---|---|---|---|---|
| 7,127,952 B2* | 10/2006 | Bitto | ..................... | G01F 1/8409 73/861.355 |
| 7,373,841 B2* | 5/2008 | Deppe | ................... | G01F 1/8472 73/861.355 |
| 7,437,949 B2* | 10/2008 | Nakao | ................... | G01F 1/8409 73/861.355 |
| 7,908,932 B2* | 3/2011 | Magliocca | ............. | G01F 1/586 73/861.12 |
| 7,971,494 B2* | 7/2011 | Hussain | ................ | G01F 1/8413 73/861.355 |
| 8,151,652 B2* | 4/2012 | van de Geest | ........ | G01F 1/8413 73/861.355 |
| 8,272,275 B2* | 9/2012 | Hussain | ................ | G01F 1/8422 73/861.355 |

(Continued)

FOREIGN PATENT DOCUMENTS

JP   1991-041319 A   2/1991

*Primary Examiner* — Jewel V Dowtin
(74) *Attorney, Agent, or Firm* — Li & Cai Intellectual Property (USA) Office

(57) ABSTRACT

A first magnetic holder is attached to a U-shaped curved tube portion of a synthetic resin made measurement tube, and a magnetomotive body having a magnetic pole surface facing forward is embedded in a distal end of the first magnetic holder. A second magnetic holder is provided on a substrate at a position facing the distal end of the first magnetic holder with a space apart therefrom. The second magnetic holder includes a permanent magnet disposed to face the magnetomotive body in the first magnetic holder with a magnetic pole surface facing toward the first magnetic holder, so that the magnetic pole surface having a magnetic pole opposite to that of the magnetomotive body face each other. The permanent magnet of the second magnetic holder retains the curved tube portion of the measurement tube elastically with a space apart therefrom by attracting the magnetomotive body with a magnetic attraction force.

14 Claims, 6 Drawing Sheets

(56) References Cited

U.S. PATENT DOCUMENTS

| | | | |
|---|---|---|---|
| 8,365,613 B2* | 2/2013 | Tsubota | G01F 1/8418 |
| | | | 73/861.355 |
| 9,234,735 B2* | 1/2016 | Glasson | G01B 3/11 |
| 9,360,358 B2* | 6/2016 | Wang | G01F 1/8409 |
| 2007/0034019 A1* | 2/2007 | Doihara | G01F 1/8409 |
| | | | 73/861.355 |
| 2014/0122008 A1* | 5/2014 | Dondoshansky | G01F 1/84 |
| | | | 702/100 |

* cited by examiner

CORIOLIS MASS FLOW METER

BACKGROUND OF THE INVENTION

1. Field of the Invention

The present invention relates to a Coriolis mass flow meter that retains a measurement tube with a space apart therefrom.

2. Related Art

The Coriolis mass flow meter is a flow meter of a type obtaining a mass flow by measuring a Coriolis force based on the fact that the Coriolis force acting on a mass point of a mass m moving toward or away from a center of rotation of a rotational vibrating system at a velocity V is proportional to a product of the mass m and the velocity V.

Compared with differential, electromagnetic, and volumetric flow meters, the Coriolis mass flow meter has various superior characteristics such as being capable of obtaining amass flow directly, having no mechanically movable portion which causes abrasion, being superior in maintainability, and, in principle, being capable of measuring a density by measuring the number of vibrations of the measurement tube.

For example, JP-A-3-41319 discloses a Coriolis mass flow meter using a U-shaped measurement tube as illustrated in FIG. 10. The measurement tube is composed of a single U-shaped measurement tube 1, and the cantilevered U-shaped measurement tube 1 repeatedly vibrates upward and downward about points fixed via mounting flanges 2a and 2b at a resonant frequency applied thereto.

Fluid to be measured flowing into the measurement tube 1 causes distortion of the measurement tube 1 by a Coriolis force generated by a flowing velocity with respect to the measurement tube 1 when flowing from an inlet port toward a curved portion of a U shape, and causes distortion of the measurement tube 1 in an opposite direction by the Coriolis force when flowing from the curved tube portion toward an outlet port, which causes a vibration of the measurement tube 1.

A vibrator 3 is provided at a distal end of the measurement tube 1, which forms the U shape, displacement detection sensors 4a and 4b are mounted on the measurement tube 1 at both sides of the curved portion.

Fluid to be measured is flowed in the measurement tube 1, and the vibrator 3 is driven, so that the measurement tube 1 is vibrated. A Coriolis force of Fc=−2 mωxv, where ω is an angular speed of the vibrator 3 in a direction of vibration and v is a flow velocity of the fluid to be measured, works, and the mass flow may be measured by detecting an amplitude of the vibration which is proportional to the Coriolis force Fc by using the displacement detection sensors 4a and 4b and calculating the detected result.

A metallic tube having a high rigidity is normally used for the measurement tube 1 of the Coriolis mass flow meter of the related art to prevent a measurement error caused by deformation such that the U-shaped curved tube portion bows down under its own weight even when the measurement tube 1 is filled with the fluid to be measured, for example. However, the metallic tube is hard to process and thus it is difficult to obtain the metallic tubes having the same features by processing. When using, the size and the weight of a supporting structure are significantly large, and cost is also high.

As a consequence, usage of a synthetic resin tube as the measurement tube is conceivable. However, usage of such a synthetic resin tube may require a structure suitable for retaining the measurement tube, which is easily deformable specifically at the curved tube portion, and increased in rigidity against a vibration in contrast to advantages in good processability and light weight.

SUMMARY

In order to solve the problem described above, it is an object of the invention to provide a compact and cost-effective Coriolis mass flow meter.

In order to achieve the above-described object, an aspect of the invention is to provide a Coriolis mass flow meter including: a measurement tube that allows passage of fluid to be measured in one direction; a magnetism retaining portion that retains predetermined positions of the measurement tube with a space apart therefrom; a vibration exciter unit configured to vibrate the measurement tube; and a displacement detecting unit that detects displacement of the measurement tube at two positions on an outbound tube and an inbound tube, wherein the magnetism retaining portion provides a magnetic attraction force and a magnetic repulsive force to a magnetomotive body attached to the measurement tube or the measurement tube itself formed of a ferromagnetic body to retain the measurement tube with a space apart therefrom.

According to the Coriolis mass flow meter of the invention, with the configuration in which the measurement tube is retained by a magnetic attraction force or a magnetic repulsive force with a space apart therefrom, the measurement tube is prevented from being deformed under its own weight and a stable measurement of a flow rate based on a generated Coriolis force is enabled.

DETAIL DESCRIPTION OF INVENTION

The present invention will be described in detail with reference to embodiments illustrated in FIG. 1 to FIG. 9.

Example 1

Figure 1:
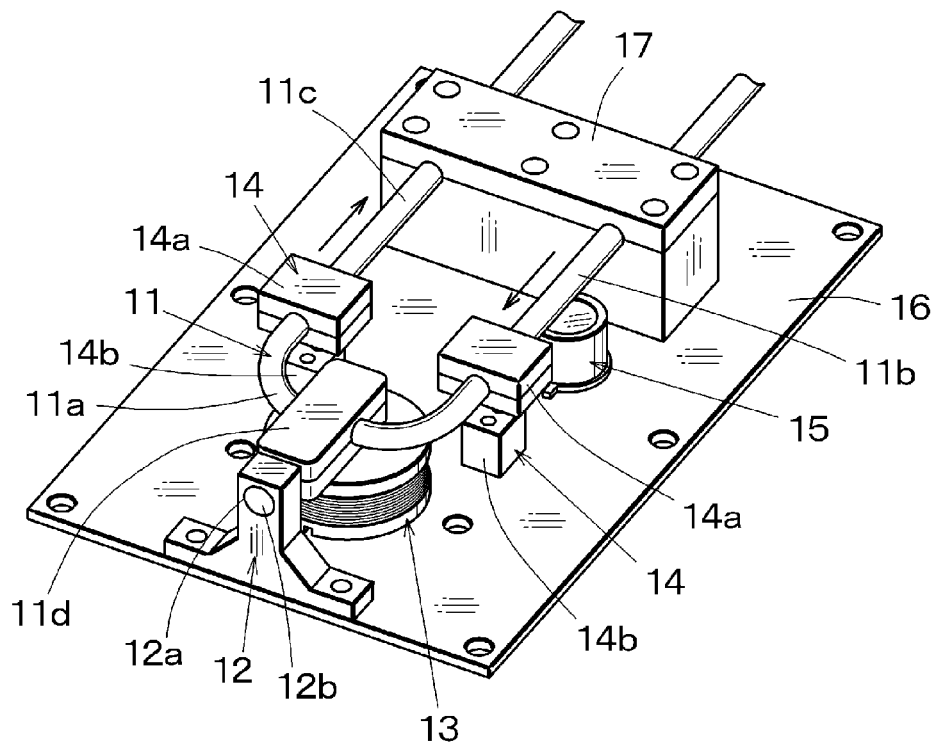
FIG. 1 is a perspective view of a Coriolis mass flow meter according to Example 1.
Figure 2:
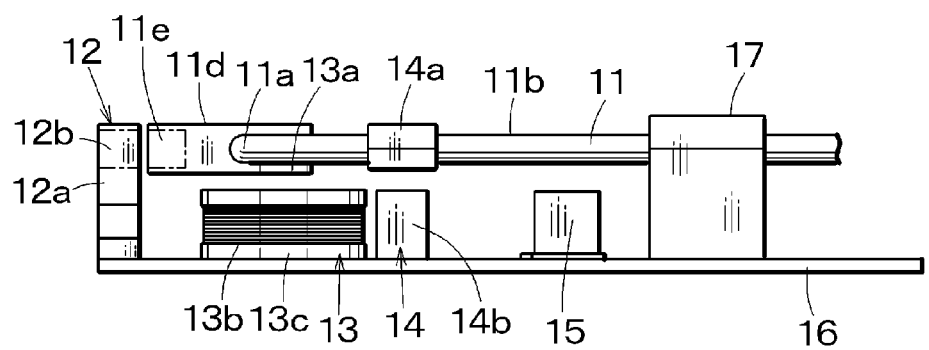
FIG. 2 is a side view.

FIG. 1 is a perspective view of a Coriolis mass flow meter according to Example 1, and FIG. 2 is a side view of the same. The Coriolis mass flow meter mainly includes: a measurement tube 11 that allows fluid to be measured to flow in one direction; a magnetism retaining portion 12 that retains predetermined positions of the measurement tube 11 by magnetic coupling with a space apart therefrom; a vibration exciter unit 13 that vibrates the measurement tube 11; a displacement detecting unit 14 that detects displacement of the measurement tube 11; a temperature measuring unit 15 that measures the fluid to be measured; and a calculation control unit, which is not illustrated, configured to input and output a detection signal and a control signal with respect to the units described above and calculate a flow rate of the fluid to be measured.

The measurement tube 11 is formed of a synthetic resin, for example, is a fluorine resin tube having a diameter of, for example, 3.2 mm, and a U-shaped curved tube portion 11a at a center portion thereof. If the fluid to be measured has no corrosive property, the measurement tube 11 may be a normal synthetic resin tube instead of the fluorine resin tube. However the measurement tube 11 may need to be formed of a material having an elastic modulus which provides hardness that can transmit a vibration sufficiently and not flexible. The diameter of the measurement tube 11 given above is only an example, and the measurement tube 11 having a given diameter may be used as a matter of course.

Two parallel portions of an outbound tube 11b and an inbound tube 11c of the measurement tube 11 having a boundary at the curved tube portion 11a therebetween are held by a housing 17 disposed on a substrate 16 in an clamped manner, so that the measurement tube 11 is fixed to the housing 17. Therefore, the curved tube portion 11a side of the measurement tube 11 with respect to fixed positions is a free end which is not mechanically supported.

Figure 3:
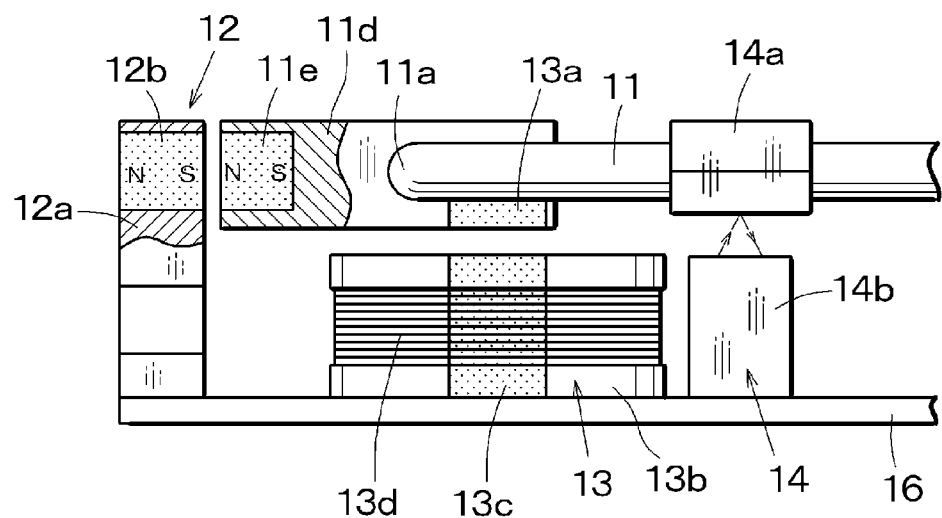
FIG. 3 is an enlarged configuration drawing illustrating a principal portion.

As illustrated in an enlarged configuration drawing of a principal portion in FIG. 3, a synthetic resin made first magnetic holder 11d is provided on the curved tube portion 11a of the measurement tube 11, and a permanent magnet or a ferromagnetic body such as iron, cobalt, nickel, or an alloy thereof having a magnetic pole surface facing forward is embedded in a distal end of the first magnetic holder 11d as a magnetomotive body 11e.

A synthetic resin made second magnetic holder 12a of the magnetism retaining portion 12 is provided on the substrate 16 at a position facing the magnetomotive body 11e formed of the permanent magnet or the ferromagnetic body embedded in the first magnetic holder 11d with a space apart therefrom. The second magnetic holder 12a includes a permanent magnet 12b formed of a strong magnet, for example, a neodymium magnet, and having a magnetic pole surface facing toward the magnetomotive body 11e. The permanent magnet 12b is disposed so as to face the magnetomotive body 11e in the first magnetic holder 11d. When the magnetomotive body 11e is a permanent magnet, magnetic poles facing each other are opposite from each other, i.e., the S-pole and the N-pole. Therefore, the permanent magnet 12b of the second magnetic holder 12a of the magnetism retaining portion 12 strongly attracts the magnetomotive body 11e with a magnetic attraction force, thereby functioning to retain the curved tube portion 11a of the measurement tube 11 with a space apart therefrom by the effect of magnetic coupling.

In this manner, the curved tube portion 11a of the measurement tube 11 of Example 1 is strongly attracted toward the second magnetic holder 12a. Therefore, the curved tube portion 11a is retained at a predetermined position by the second magnetic holder 12a, and even when fluid to be measured is poured into the measurement tube 11 in this state, the measurement tube 11 does not bow downward with the weight of the fluid to be measured, and thus the position of the curved tube portion 11a of the measurement tube 11 is retained without change.

The second magnetic holder 12a may be configured to attract the magnetomotive body 11e by using an electromagnetic coil instead of the permanent magnet 12b. Alternatively, a configuration in which the magnetomotive body 11e formed of the permanent magnet is attached to the first magnetic holder 11d, and a ferromagnetic body is disposed on the second magnetic holder 12a to cause the ferromagnetic body of the second magnetic holder 12a to apply a magnetic attraction force to the ferromagnetic body of the second magnetic holder 12a by utilizing a magnetic flux generated from the permanent magnet of the magnetomotive body 11e is also applicable.

The vibration exciter unit 13 configured to generate a Coriolis force is provided on the substrate 16. The permanent magnet is attached to a lower side of the first magnetic holder 11d as a vibration exciter 13a functioning as part of the vibration exciter unit 13 with the magnetic pole surface thereof facing downward. An electromagnetic coil 13b, which is an electromagnet, is provided on the substrate 16 below the vibration exciter 13a, and constitutes the vibration exciter unit 13 in cooperation with the vibration exciter 13a.

Electricity is supplied to a coil 13d wound around an iron core 13c of the electromagnetic coil 13b while switching a direction of current, and the direction of magnetic flux generated from an end of the iron core 13c is switched, whereby the magnetic attraction force and a magnetic repulsive force act on the vibration exciter 13a repeatedly. Accordingly, a predetermined vibration may be applied to the measurement tube 11 via the vibration exciter 13a and the first magnetic holder 11d without contact.

The vibration is preferably applied to a center position of lateral symmetry of the measurement tube 11. The frequency of vibration is a resonance frequency or an integral multiple of the measurement tube 1 in a state in which the measurement tube 11 is filled with the fluid to be measured, and normally, is several tens to several hundreds Hz obtained by auto tuning, and is different depending on the elastic modulus, the shape, and the type of the fluid to be measured of the measurement tube 11.

Since an amplitude of vibration applied by the vibration exciter unit 13 is minute, the measurement tube 11 may be vibrated even though the measurement tube 11 is retained by the magnetism retaining portion 12. A vibration exciter mechanism other than the electromagnetic coil 13b may be employed in the vibration exciter unit 13. The vibration exciter 13a may be formed of a ferromagnetic body such as iron, cobalt, nickel or an alloy thereof instead of the permanent magnet.

In order to detect the magnitude of displacement of the measurement tube 11 due to vibration during measurement of the flow rate, that is, the magnitude of the Coriolis force, the displacement detecting units 14 based on an optical sensor are disposed at two positions on the outbound tube 11b and the inbound tube 11c of the measurement tube 11 parallel to each other. Light reflecting portions 14a are attached to the measurement tube 11, and light receiving and emitting portions 14b are disposed on the substrate 16 below the respective light reflecting portions 14a.

In each of the displacement detecting units 14, light beam from the light receiving and emitting portion 14b is directed toward the light reflecting portion 14a, and reflected light therefrom is received by the light receiving and emitting portion 14b, so that the positional displacement of the reflected light is detected. From the positional displacement, a distance from the light receiving and emitting portion 14b to the light reflecting portion 14a, that is, distances from the light receiving and emitting portions 14b to the outbound tube 11b and the inbound tube 11c are measured respectively, and a calculation control unit calculates amounts corresponding to amounts of distortion of the outbound tube 11b and the inbound tube 11c due to the Coriolis force may be obtained by time difference detection. A flow rate is obtained on the basis of the detected amounts. As the calculating method is a known method, description will be omitted.

The displacement detecting units 14 are configured to measure the distance by a method of detecting the positional displacement. However, the distance may be detected by a blurring detecting method, or an optical interferometry, and the like. Alternatively, an electromagnetic displacement detector, for example, may be used instead of the light-detecting method. However, the light detecting method does not apply a force to the measurement tube 11, and a minute Coriolis force is not affected, so that measurement of the flow rate with high degree of accuracy is enabled.

The temperature measuring unit 15 that measures the temperature of the fluid to be measured in the measurement tube 11 remotely is disposed on the substrate 16 below the measurement tube 11. When the measurement tube 11 is warmed up or cooled down by the temperature of the fluid to be measured, the elastic modulus varies, and the resonance vibration frequency or a surface of distortion of the measurement tube 11 minutely varies. Therefore, the temperature of the fluid in the measurement tube 11 is preferably measured in order to correct these variations. Necessity of measurement of the fluid to be measured by using the temperature measuring unit 15 is eliminated if the temperature of the fluid to be measured is measured at a position other than the Coriolis mass flow meter.

Figure 4:
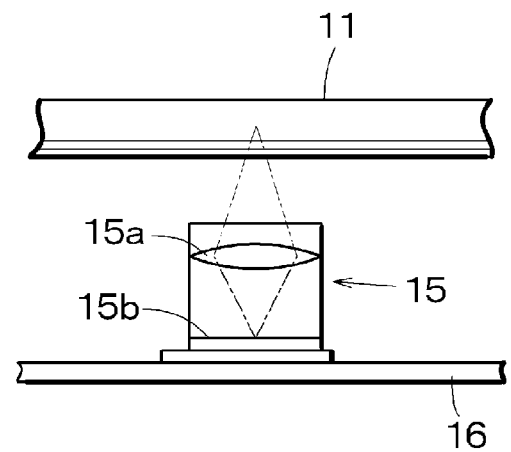
FIG. 4 is a configuration drawing illustrating a temperature measuring unit.

FIG. 4 is a configuration drawing of, for example, an infrared thermometer, used as the temperature measuring unit 15, and the temperature measuring unit 15 includes a lens optical system 15a and a temperature sensing device 15b. The lens optical system 15a conjugates the focuses of obtained infrared ray at the fluid to be measured in the transparent or translucent synthetic resin made measurement tube 11 and the temperature sensing device 15b. The temperature sensing device 15b senses infrared ray which depends on the temperature of the fluid in the measurement tube 11 via a wavelength selecting optical filter, which is not illustrated, and measures the temperature remotely without contact. In Example 1, since the Coriolis mass flow meter is covered with a cover to make the interior thereof a dark room, an exterior light in the periphery does not cause a disturbance in temperature measurement.

Example 2

Figure 5:
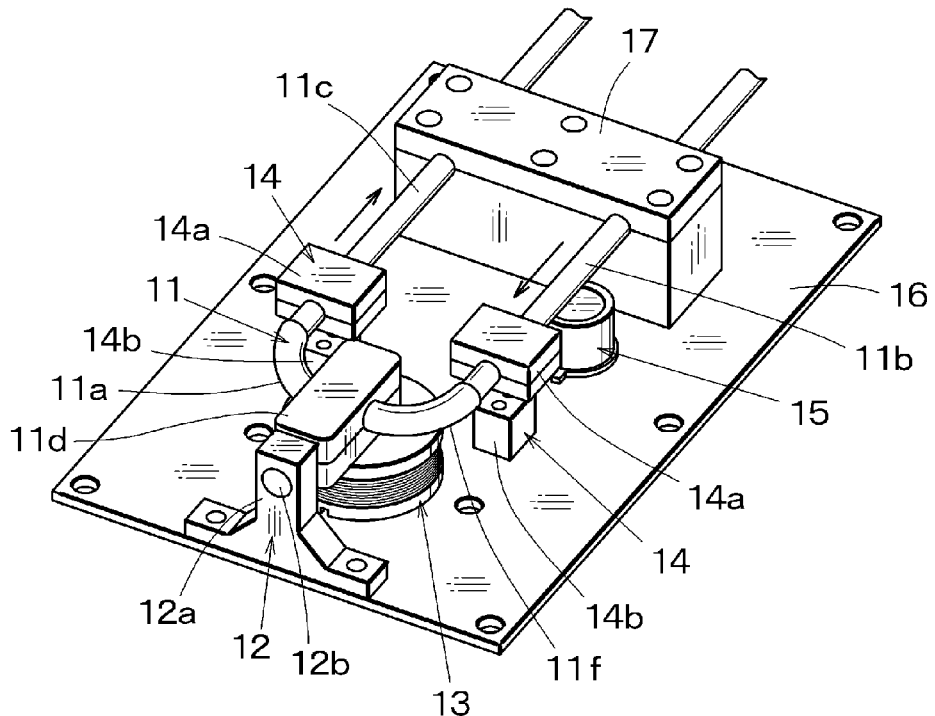
FIG. 5 is a perspective view of Example 2.

FIG. 5 is a perspective view of Example 2. A principal portion of Example 2 is the same as that in Example 1, and the same reference numerals as those in Example 1 denote the same members. The curved tube portion 11a is covered with a metallic tube or a synthetic resin tube, more preferably, with a reinforcing tube 11f formed of a metallic tube as a reinforcing member for shape retention. When the measurement tube 11 of a synthetic resin tube is employed, the curved tube portion 11a is susceptible to deformation during manufacture or use, and thus the reinforcing tube 11f is preferably provided so as to cover the curved tube portion 11a.

In this manner, with the curved tube portion 11a covered with the reinforcing tube 11f, the risk of deformation of the curved tube portion 11a is avoided, and the shape retention is achieved even when the measurement tube 11 is formed of a synthetic resin.

The curved tube portion 11a covered with the reinforcing tube 11f in Example 2 is strongly attracted by the magnetic attraction force toward the magnetic holder 12a in the same manner as Example 1. Therefore, even when fluid to be measured is poured into the measurement tube 11 in this state, the position of the curved tube portion 11a is elastically retained and without changing the position by bowing downward with the weight of the fluid to be measured and, in addition, deformation of the curved tube portion 11a by the reinforcing tube 11f is prevented.

Example 3

Figure 6:
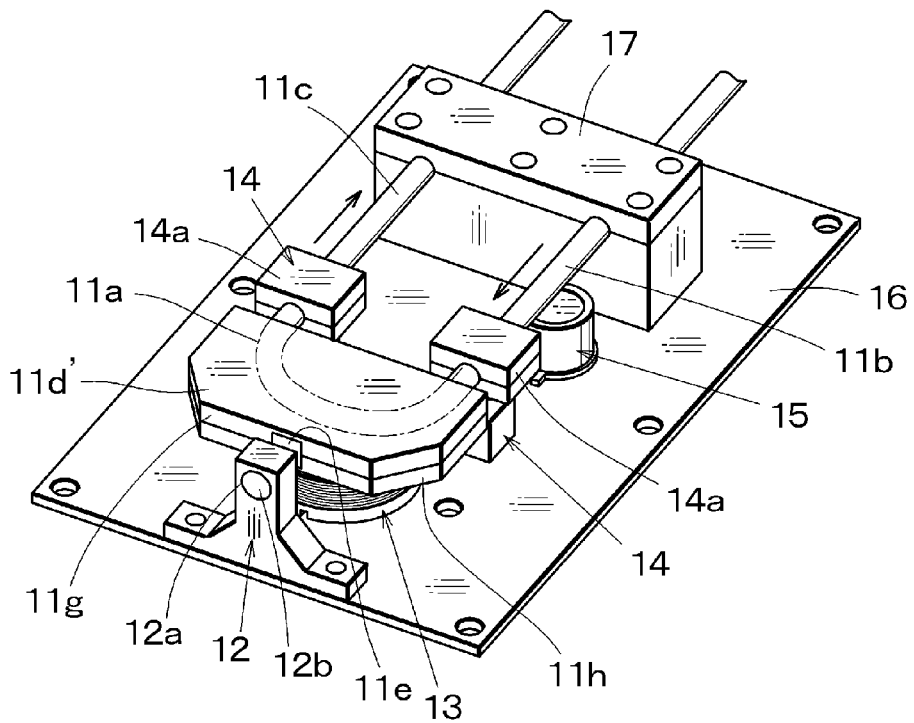
FIG. 6 is a perspective view of Example 3.
Figure 7:
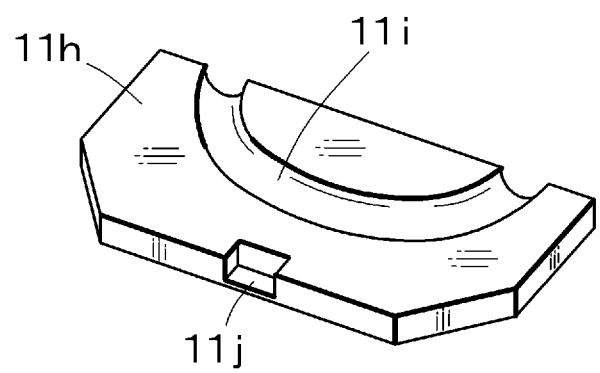
FIG. 7 is a perspective view of a reinforcing plate on one side.

FIG. 6 is a perspective view of Example 3, and FIG. 7 is a perspective view of a reinforcing plate on one side. The curved tube portion 11a of the measurement tube 11 is provided with a magnetic holder with reinforcement feature 11d' attached thereto as a reinforcement member for shape retention. The magnetic holder with reinforcement feature 11d' is formed of a synthetic resin material or a metallic material, and includes a pair of reinforcing plates 11g and 11h used in an overlapped manner.

A groove portion 11i having a semi-circular shape in cross section having the same shape as the curved tube portion 11a is formed on a mating surface between the reinforcing plates 11g and 11h, so that the curved tube portion 11a is clamped between the reinforcing plates 11g and 11h and is accommodated in the groove portion 11i when the reinforcing plates 11g and 11h are fixed to the curved tube portion 11a in an overlapped manner from both above and below.

A depressed portion 11j is formed at a distal end side of each of the reinforcing plates 11g and 11h, and the magnetomotive body 11e is disposed in the depressed portion 11j. In other words, the vibration exciter 13a that functions as part of the vibration exciter unit 13 is attached to a lower surface of the magnetic holder with reinforcement feature 11d', that is, to a lower surface of the reinforcing plate 11h.

In this configuration, the magnetism retaining portion 12 elastically attracts and retains the curved tube portion 11a by the magnetic attraction force of the permanent magnet 12b with respect to the magnetomotive body 11e, and the vibration exciter unit 13 vibrates the measurement tube 11 via the vibration exciter 13a in the same manner as in Examples 1 and 2. The shape of the curved tube portion 11a of the measurement tube 11 is retained by the reinforcing plates 11g and 11h, so that stable measurement of the flow rate is enabled without deformation of the shape.

Example 4

Figure 8:
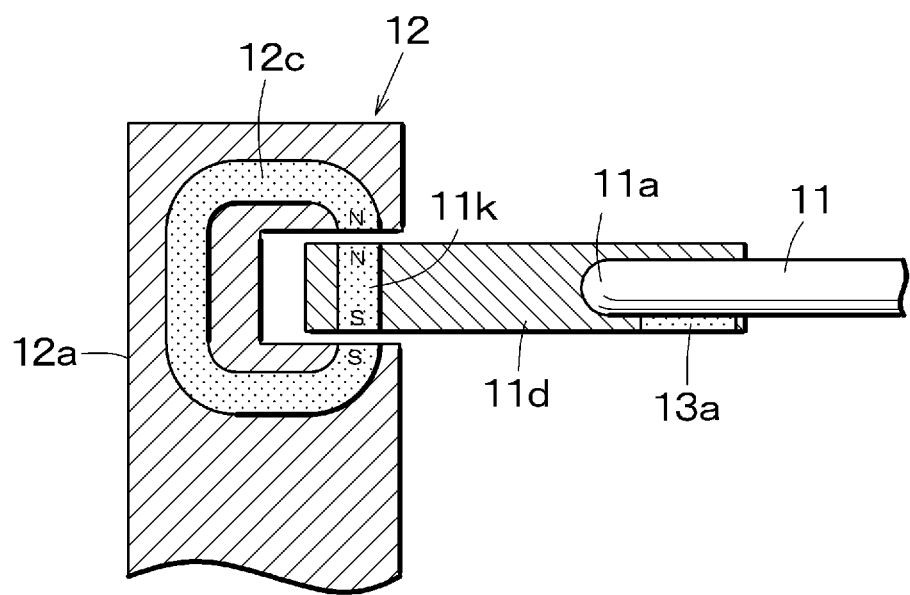
FIG. 8 is a configuration drawing of a magnetic coupling portion of Example 4.

FIG. 8 is a configuration drawing of a magnetic coupling portion of Example 4. As in Example 1, at a distal end of the first magnetic holder 11d attached to the curved tube portion 11a of the measurement tube 11, a magnetomotive body 11k formed of a permanent magnet is disposed with the magnetic pole surfaces of the N-pole and the S-pole facing upward and downward orthogonally to a surface that connects the outbound tube 11b and the inbound tube 11c. A C-shaped permanent magnet 12c fixed to the second magnetic holder 12a and having magnetic pole surfaces facing each other in a vertical direction is disposed in the magnetism retaining portion 12 so as to face the magnetic pole surfaces of the magnetomotive body 11k on both sides. The magnetic pole surfaces of the magnetomotive body 11k and the permanent magnet 12c are disposed so as to face each other, and the faced magnetic pole surfaces have the same magnetic pole, so that the magnetic repulsive force acts between the magnetic poles of the magnetomotive body 11k and the permanent magnet 12c.

In this configuration, the first magnetic holder 11d is not displaced in any of upward and downward direction owing to the magnetic repulsive force between the magnetomotive body 11k and the permanent magnet 12c, and the curved tube portion 11a of the measurement tube 11 is retained at the predetermined position by the second magnetic holder 12a with a space apart therefrom.

When using the magnetic repulsive force in this manner, a structure may need to be devised so as to avoid deviation of one of the magnetic poles from a range of a magnetic force of the other magnetic pole.

Example 5

Figure 9A:
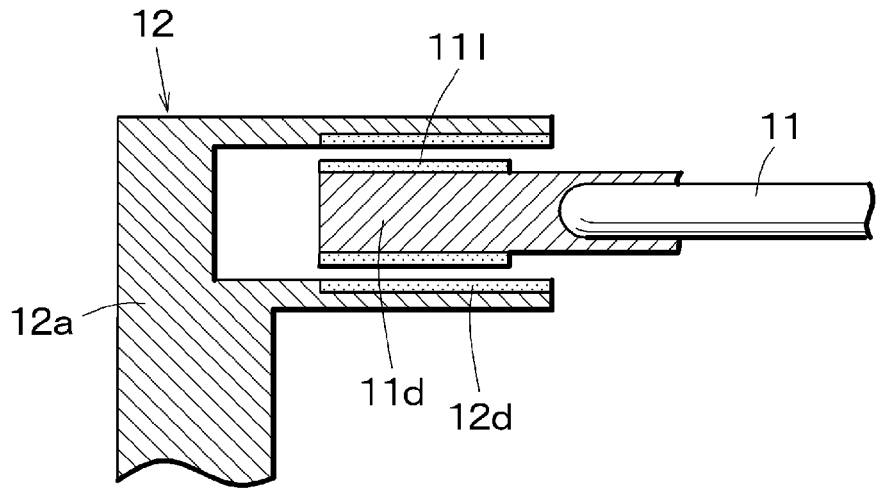
FIG. 9A is a configuration drawing of a magnetic coupling portion of Example 5.
Figure 9B:
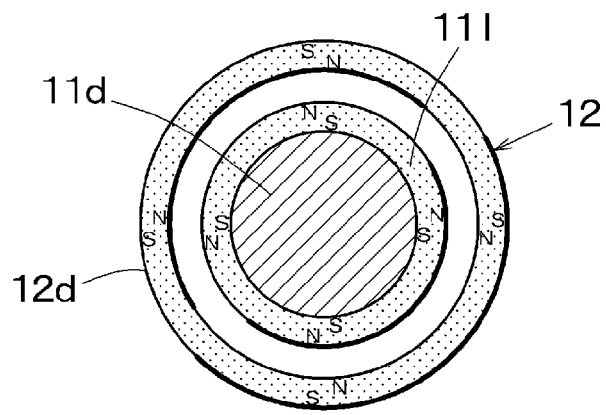
FIG. 9B is an enlarged lateral cross-sectional view of the magnetic coupling portion.

FIGS. 9A and 9B illustrate Example 5. FIG. 9A is a configuration drawing illustrating the magnetic coupling portion, and FIG. 9B is an enlarged lateral cross section thereof. The first magnetic holder 11d attached to the curved tube portion 11a of the measurement tube 11 and protruded toward the front has a circular cross section, and includes a magnetomotive body 111, which is an annular permanent magnet provided in the periphery thereof. The magnetism retaining portion 12 is fixedly disposed on the substrate 16 with an annular outer permanent magnet 12d being supported by the second magnetic holder 12a so as to be placed in the periphery of the magnetomotive body 111 with a space apart therefrom. The magnetic pole surface on an outer periphery of the magnetomotive body 111 and the outer permanent magnet 12d on an inner periphery of the outer permanent magnet 12d have the same magnetic pole, so that a magnetic repulsive force acts therebetween.

Accordingly, the first magnetic holder 11d of the measurement tube 11, having the magnetomotive body 111 placed in the periphery thereof, is retained at the center of the outer permanent magnet 12d with a space apart therefrom, so that the positional relationship therebetween is retained even though the fluid to be measured is flowed in the measurement tube 11.

Figure 9C:
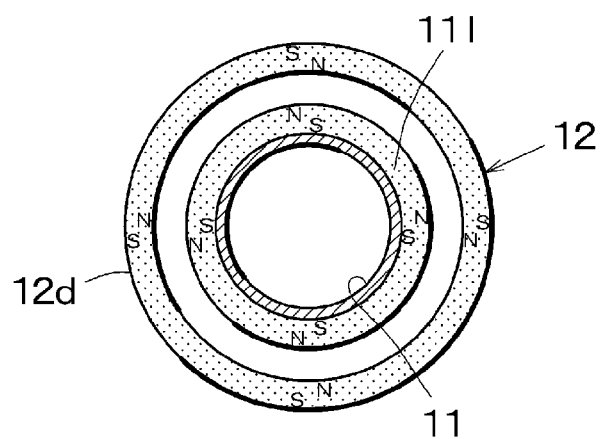
FIG. 9C is a configuration drawing of a magnetic coupling portion of a modification of Example 5.
Figure 10:
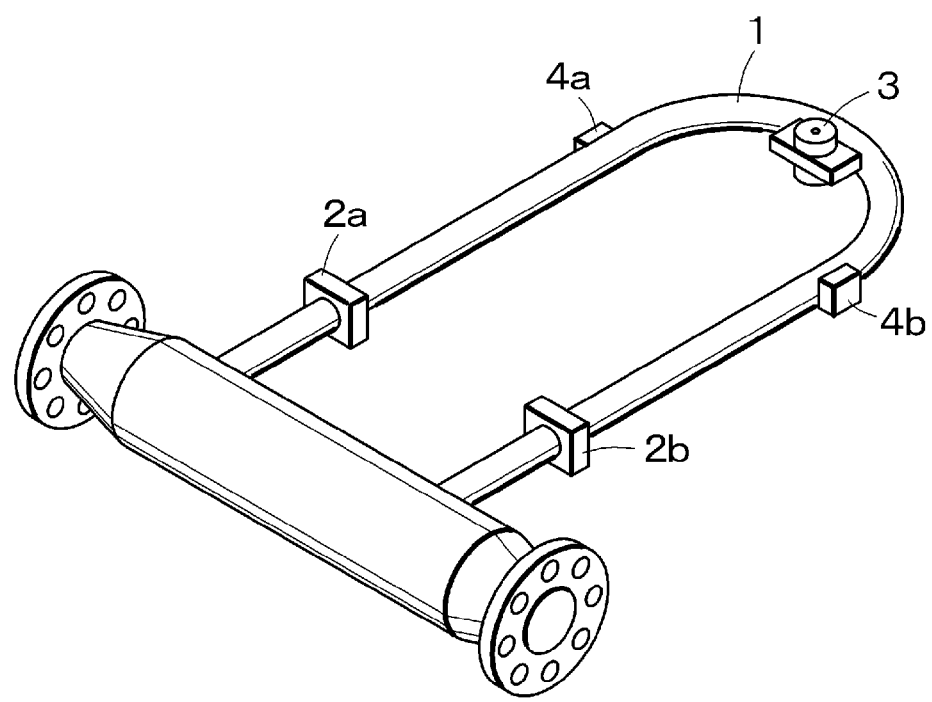
FIG. 10 is a perspective view of a Coriolis mass flow-meter of the related art.

FIG. 9C illustrates a magnetic coupling portion of a modification in Example 5. The magnetomotive body 111, which is an annular permanent magnet, is provided directly on the periphery of the curved tube portion 11a of the measurement tube 11, and the magnetism retaining portion 12 is fixedly disposed on the substrate 16 with an annular outer permanent magnet 12d being supported by the second magnetic holder 12a so as to be placed in the periphery of the magnetomotive body 111 with a space apart therefrom. The magnetic pole surface on an outer periphery of the magnetomotive body 111 and the magnetic pole surface on an inner periphery of the outer permanent magnet 12d have the same magnetic pole.

In this case as well, the curved tube portion 11a of the measurement tube 11 is retained at the center of the outer permanent magnet 12d, and thus the measurement tube 11 is retained by a magnetic repulsive force with a space apart therefrom even though the fluid to be measured is flowed in the measurement tube 11 in the same manner. The magnetic coupling portion of the modification may be used effectively for a straight measurement tube that does not have the curved tube portion 11a.

In Examples 1 to 5 described above, the magnetomotive body is attached to the measurement tube 11 to retain the position of the measurement tube 11 by the second magnetic holder 12a from the outside. However, if the measurement tube 11 is formed of a ferromagnetic body such as iron, nickel, cobalt, or an alloy thereof, the measurement tube 11 itself may be used as the magnetomotive body.

In respective examples, the measurement tube 11 is disposed horizontally. However, the measurement tube 11 may be oriented in the vertical direction to detect the Coriolis force.

Terms up and down or above and below in the specification indicate the direction or position in the drawings, and are not necessarily up and down or above and below in the actual apparatus.

The invention may be applied to Coriolis mass flow meters that employ various types of measurement tubes including a straight measurement tube which is not described in the examples. Even when the measurement tube is formed of a metal, the shape may be retained by the magnetic attraction force or the magnetic repulsive force, so that the supporting structure with high rigidity does not have to be used, which is advantageous in terms of cost.

What is claimed is:

1. A Coriolis mass flow meter comprising:
a measurement tube that allows passage of fluid to be measured in one direction;
a magnetism retaining portion that retains predetermined positions of the measurement tube with a space apart therefrom;
a vibration exciter unit configured to vibrate the measurement tube; and
a displacement detecting unit that detects displacement of the measurement tube at two positions on an outbound tube and an inbound tube of the measurement tube,
wherein the magnetism retaining portion provides a magnetic attraction force and a magnetic repulsive force to a magnetomotive body attached to the measurement tube or the measurement tube itself formed of a magnetomotive body or a ferromagnetic body to retain the measurement tube with a space apart therefrom.

2. The Coriolis mass flow meter according to claim 1, wherein the measurement tube is formed of a synthetic resin.

3. The Coriolis mass flow meter according to claim 1, wherein the magnetomotive body attached to the measurement tube is a permanent magnet or a ferromagnetic body, and a permanent magnet or an electromagnetic coil is disposed in the magnetism retaining portion, and the measurement tube is retained by the magnetic attraction force.

4. The Coriolis mass flow meter according to claim 1, wherein the magnetomotive body attached to the measurement tube is a permanent magnet, and the ferromagnetic body is disposed in the magnetism retaining portion, and the measurement tube is retained by the magnetic attraction force.

5. The Coriolis mass flow meter according to claim 1, wherein while the measurement tube is formed of the ferromagnetic body, a permanent magnet or an electromagnetic coil is disposed in the magnetism retaining portion, and the measurement tube is retained by the magnetic attraction force.

6. The Coriolis mass flow meter according to claim 1, wherein retention of the measurement tube is effected on a curved tube portion provided at a boundary between the outbound tube and the inbound tube.

7. The Coriolis mass flow meter according to claim 6, wherein the magnetomotive body is attached to the curved tube portion of the measurement tube.

8. The Coriolis mass flow meter according to claim 6, wherein a reinforcing member is attached to outside of the curved tube portion to retain the shape of the curved tube portion.

9. The Coriolis mass flow meter according to claim 8, wherein the reinforcing member is a metallic reinforcing tube covered on the curved tube portion.

10. The Coriolis mass flow meter according to claim 9, wherein the reinforcing member is a pair of reinforcing plates that hold the curved tube portion so as to be interposed therebetween, the reinforcing plates have a groove portion having the same shape as the curved tube portion, and are overlapped with each other from both sides of the curved tube portion.

11. The Coriolis mass flow meter according to claim 1, wherein the magnetomotive body formed of a permanent magnet having a magnetic pole surface facing a direction orthogonal to a surface connecting the outbound tube and the inbound tube of the measurement tube is attached to the measurement tube, two magnetic pole surfaces of a permanent magnet or an electromagnetic coil are disposed as the magnetism retaining portion so as to face the both magnetic pole surfaces of the magnetomotive body, and a magnetic pole of the magnetomotive body and a magnetic pole of the magnetism retaining portion opposing thereto are set to be the same to retain the measurement tube by a magnetic repulsive force between the magnetomotive body and the magnetism retaining portion.

12. The Coriolis mass flow meter according to claim 1, wherein the magnetomotive body formed of an annular permanent magnet is provided on a periphery of the measurement tube, an annular outer permanent magnet is disposed on outside of the magnetomotive body with a space apart therefrom as the magnetism retaining portion, and a magnetic pole surface on an outer periphery of the magnetomotive body and a magnetic pole surface on an inner periphery of the outer permanent magnet are set to have the same magnetic pole to cause the outer permanent magnet to retain the measurement tube at a center thereof with a space apart therefrom by a magnetic repulsive force.

13. The Coriolis mass flow meter according to claim 1, wherein the vibration exciter unit includes a vibration exciter formed of a permanent magnet or a ferromagnetic body attached to part of the measurement tube, and is configured to vibrate the measurement tube by an electromagnetic coil via the vibration exciter at a predetermined frequency.

14. The Coriolis mass flow meter according to claim 2, wherein a temperature of fluid in the measurement tube formed of a transparent or translucent synthetic resin is measured remotely from the outside of the measurement tube with an infrared thermometer.

* * * * *